(12) United States Patent
Komatsu et al.

(10) Patent No.: US 11,275,246 B2
(45) Date of Patent: Mar. 15, 2022

(54) HEAD-MOUNTED DISPLAY

(71) Applicant: SEIKO EPSON CORPORATION, Tokyo (JP)

(72) Inventors: Akira Komatsu, Tatsunomachi (JP); Masayuki Takagi, Azumino (JP); Toshiaki Miyao, Matsumoto (JP); Takashi Takeda, Suwa (JP); Tokito Yamaguchi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 316 days.

(21) Appl. No.: 16/505,852

(22) Filed: Jul. 9, 2019

(65) Prior Publication Data
US 2020/0018966 A1 Jan. 16, 2020

(30) Foreign Application Priority Data
Jul. 10, 2018 (JP) .............................. JP2018-130463

(51) Int. Cl.
*G02B 27/01* (2006.01)

(52) U.S. Cl.
CPC .... *G02B 27/0172* (2013.01); *G02B 2027/014* (2013.01); *G02B 2027/0123* (2013.01); *G02B 2027/0187* (2013.01)

(58) Field of Classification Search
CPC ........ G02B 27/0172; G02B 2027/0123; G02B 2027/014; G02B 2027/0187; G02B 27/283; G02B 5/10; G02B 27/01; G02B 27/0101; G02B 27/0103; G02B 27/0149; G02B 27/017; G02B 27/0176; G02B 27/0179; G02B 27/0189; G02B 2027/0105; G02B 2027/0107; G02B 2027/0109; G02B 2027/011; G02B 2027/0112; G02B 2027/0114; G02B 2027/0116;
(Continued)

(56) References Cited

U.S. PATENT DOCUMENTS 9,507,066 B2 * 11/2016 Kollin .................. G02B 5/3058
2005/0219671 A1 * 10/2005 Inoguchi ............ G02B 27/0172
359/208.1
(Continued)

FOREIGN PATENT DOCUMENTS

JP        2008-046253 A     2/2008

*Primary Examiner* — Marin Pichler
*Assistant Examiner* — Henry A Duong
(74) *Attorney, Agent, or Firm* — Oliff PLC

(57) ABSTRACT

A head-mounted display includes a display device, a projection optical member, a prism member, and a light condensing and reflecting surface. The prism member includes a first prism, and a second prism that is disposed further toward an exit pupil side than the first prism. The first prism includes an incident surface, a reflection surface that totally reflects the image light, and a first joining surface that is joined with the second prism via a semi-transmissive reflection surface. The second prism includes a second joining surface that is joined with the first joining surface, and an opposing flat surface that is disposed parallel to the reflection surface to face the reflection surface and configured to transmit the image light, reflected by the semi-transmissive reflection surface and then by the light condensing and reflecting surface and thereafter passing through the semi-transmissive reflection surface.

11 Claims, 9 Drawing Sheets

(58) Field of Classification Search
CPC ...... G02B 2027/0118; G02B 2027/012; G02B 2027/0121; G02B 2027/0125; G02B 2027/0127; G02B 2027/0129; G02B 2027/013; G02B 2027/0132; G02B 2027/0134; G02B 2027/0136; G02B 2027/0138; G02B 2027/0141; G02B 2027/0143; G02B 2027/0145; G02B 2027/0147; G02B 2027/015; G02B 2027/0152; G02B 2027/0154; G02B 2027/0156; G02B 2027/0158; G02B 2027/0159; G02B 2027/0161; G02B 2027/0163; G02B 2027/0165; G02B 2027/0167; G02B 2027/0169; G02B 2027/0174; G02B 2027/0178; G02B 2027/0181; G02B 2027/0183; G02B 2027/0185; G02B 2027/019; G02B 2027/0192; G02B 2027/0194; G02B 2027/0196; G02B 2027/0198
USPC .......................................................... 359/630
See application file for complete search history.

(56) References Cited

U.S. PATENT DOCUMENTS

| | | | |
|---|---|---|---|
| 2007/0064310 A1* | 3/2007 | Mukawa | H04N 5/7491 359/630 |
| 2008/0021295 A1 | 1/2008 | Wang et al. | |
| 2010/0277803 A1* | 11/2010 | Pockett | G02B 27/4205 359/567 |
| 2012/0200937 A1* | 8/2012 | Totani | H04N 13/344 359/631 |
| 2015/0160460 A1* | 6/2015 | Komatsu | G02B 17/0856 359/629 |

* cited by examiner

HEAD-MOUNTED DISPLAY

The present application is based on, and claims priority from JP Application Serial Number 2018-130463, filed Jul. 10, 2018, the disclosure of which is hereby incorporated by reference herein in its entirety.

BACKGROUND

1. Technical Field

The present disclosure relates to a head-mounted display that enables observation of a virtual image by being mounted on a head.

2. Related Art

In JP 2008-46253 A, an optical system is disclosed in which light from an image forming element is caused to travel in a straight line by transmission through a half mirror and to be incident on a reflecting mirror while being caused to converge in a light condensing optical system, and light from the reflecting mirror is reflected back by the half mirror, is caused to be incident on a reflection surface having an optical power, is once again caused to travel in a straight line through the half mirror, and is guided to an eye of an observer via an eyepiece optical system.

However, in the optical system disclosed in JP 2008-46253 A, it is assumed that an inclination angle of the half mirror with respect to an optical axis extending in front of the eye is set to approximately 45°, and when attempting to secure the angle of view, an occupying width in the optical axis direction of the half mirror and the periphery of the half mirror increases, and it is not easy to reduce the size of the optical system.

SUMMARY

A head-mounted display according to an aspect of the present disclosure includes a display element, a projection optical member configured to project image light emitted from the display element to a prism member, a prism member configured to receive the image light emitted from the projection optical member and emit the image light to a position of an exit pupil, and a light condensing and reflecting surface disposed at an external side of the prism member, with the external side being an opposite side from the exit pupil across the prism member, and configured to return at least a portion of the image light, which has been emitted from the prism member, to the prism member. The prism member includes a first prism on which the image light from the projection optical member is incident, and a second prism that is disposed further toward the exit pupil side than the first prism. The first prism includes an incident surface on which the image light is incident, a reflection surface that totally reflects the image light from the incident surface, and a first joining surface that is joined with the second prism via a semi-transmissive reflection surface that reflects the image light totally reflected by the reflection surface toward the reflection surface. The second prism includes a second joining surface that is joined with the first joining surface via the semi-transmissive reflection surface, and an opposing flat surface that is disposed parallel to the reflection surface to face the reflection surface and configured to transmit the image light, reflected by the semi-transmissive reflection surface and then by the light condensing and reflecting surface and thereafter passing through the semi-transmissive reflection surface.

DESCRIPTION OF EXEMPLARY EMBODIMENTS

First Embodiment

Below, a head-mounted display according to a first embodiment of the present disclosure will be described with reference to the accompanying drawings.

Figure 1A:
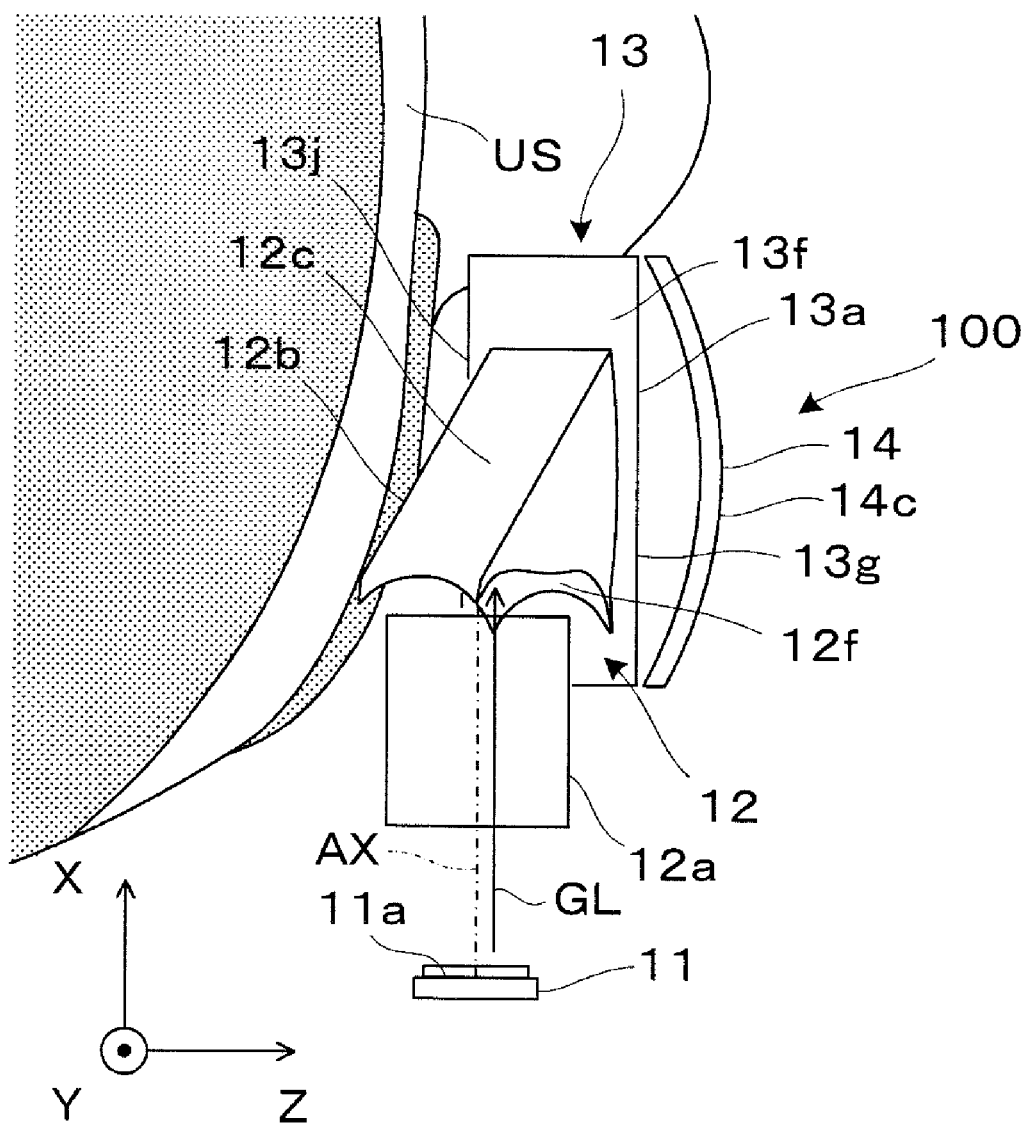
FIG. 1A is a plan view illustrating a head-mounted display according to an embodiment.
Figure 1B:
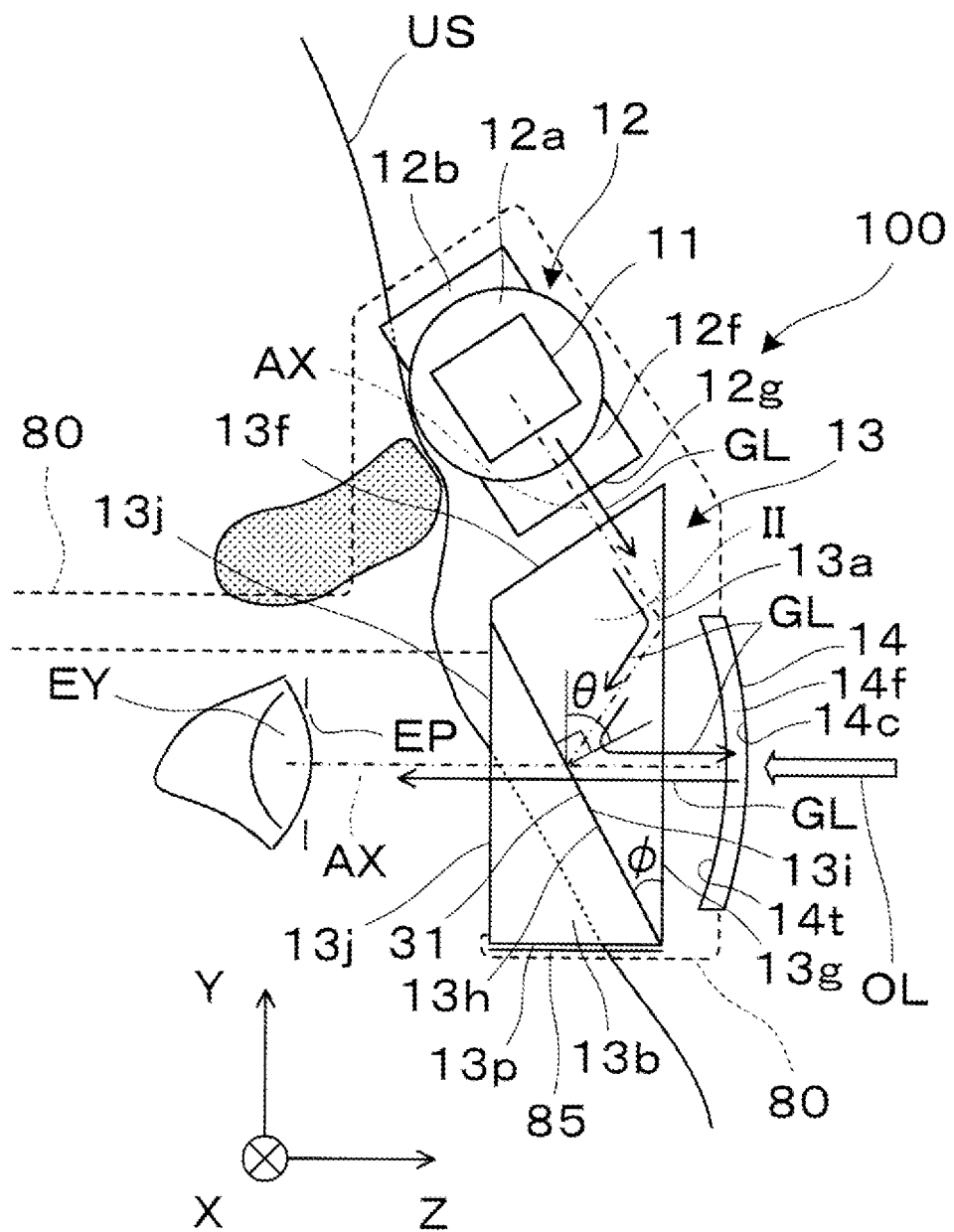
FIG. 1B is a side cross-sectional view illustrating the head-mounted display according to the embodiment.
Figure 1C:
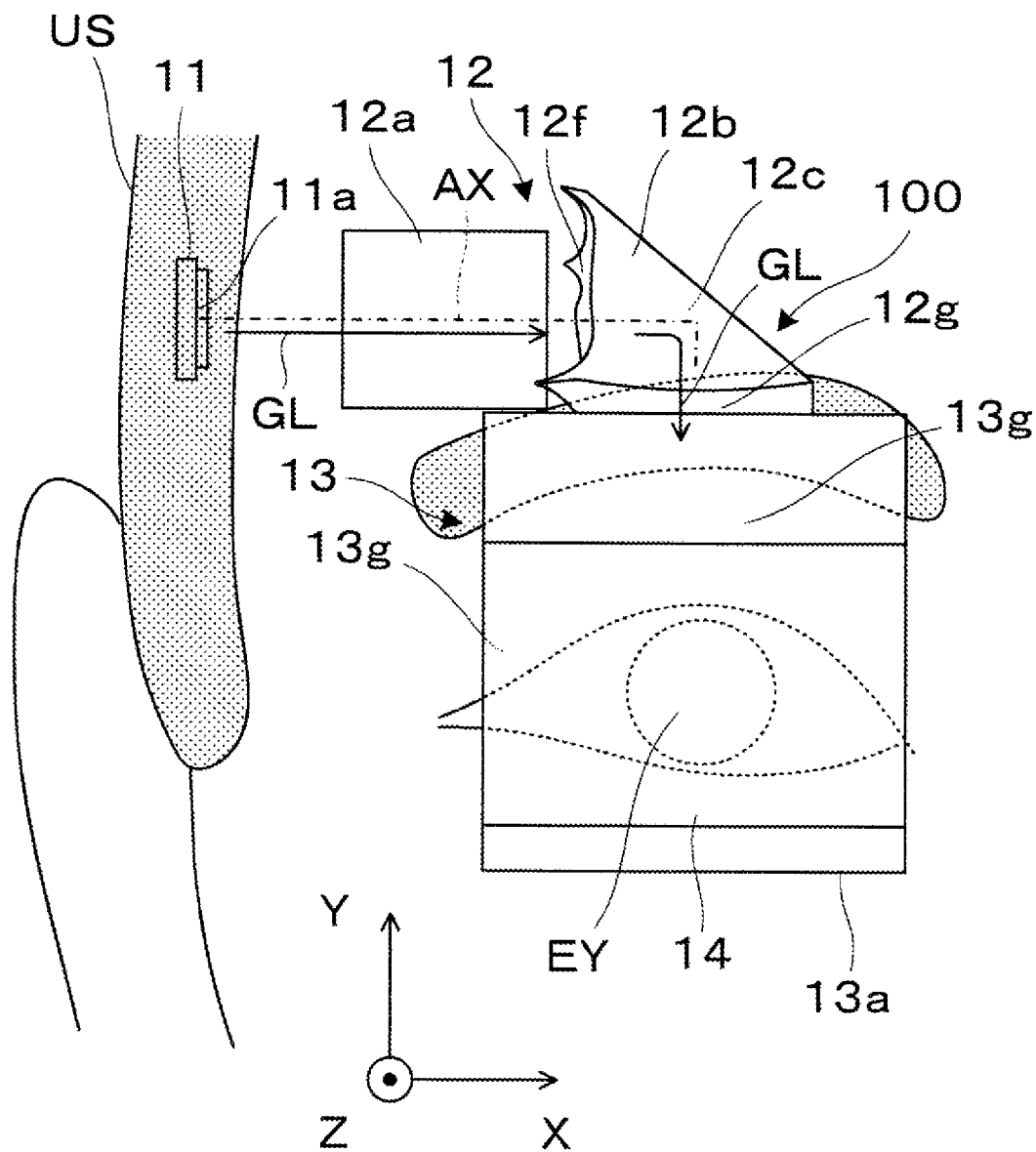
FIG. 1C is a front view illustrating the head-mounted display according to the embodiment.

In FIGS. 1A to 1C, X, Y, and Z are orthogonal coordinate systems in which the X direction corresponds to a lateral direction in which both eyes of an observer US, who is wearing a head-mounted display 100, are aligned side by side, the Y direction corresponds to an upward direction orthogonal to the lateral direction in which both the eyes of the observer US are aligned side by side, and the Z direction corresponds to a forward direction or a front direction for the observer US. Note that the Y direction corresponds to a direction in which a prism member 13 described below extends, the Z direction corresponds to a thickness direction of the prism member 13, and the X direction is a direction orthogonal to the Y and Z directions.

The illustrated head-mounted display 100 causes the observer US to recognize a projected image, which is a virtual image. The head-mounted display 100 includes a display device 11, a projection optical member 12, the prism member 13, and a light condensing and reflecting member 14. The display device 11 and the projection optical member 12 are housed in a case of a frame 80, and the prism member 13 and the light condensing and reflecting member 14 are supported by the frame 80 in an exposed state. Note that although only the head-mounted display 100 for the right eye is illustrated in the drawings, this can be combined with a virtual image display device for the left eye having the same structure or a similar structure in which left and right parts thereof are inverted, and in this case, the head-mounted display 100 having an appearance like glasses or swimming goggles as a whole can be obtained. With a virtual image display device for the right eye or the left eye, one of them can be omitted, and in this case, a one-eye type head-mounted display is obtained.

The display device 11 is a light-emitting type display element represented by, for example, an organic EL, a LED array, an organic LED, a quantum dot light-emitting type inorganic EL, and the like, and forms a color still image or a color moving image on a two-dimensional display surface 11a. The display device 11 is driven by a drive control circuit (not illustrated) to perform display operations. The display device 11 is not limited to the light-emitting type display element, may be configured by an LCD or another light modulating element, and may form an image by illuminating the light modulating element with a light source.

The projection optical member 12 includes a projection lens 12a that causes image light GL emitted from a display surface 11a of the display device 11 to be incident on the projection lens 12a itself and projects the image light GL, and a prism mirror 12b for optical path bending. The projector lens 12a includes a plurality of spherical or aspherical element lenses (not illustrated) arranged along an optical axis AX that extends parallel to a lateral X-axis. The prism mirror 12b includes an internal reflection-type bending mirror 12c, and bends an optical path that is substantially parallel to the lateral X-axis to an optical path that is inclined with respect to both a Y-axis and a Z-axis, more specifically, that is inclined obliquely downward toward the front. The prism mirror 12b can be replaced by a surface reflection-type bending mirror 12c that is formed on one side of a plate-like member. The prism mirror 12b includes a first surface 12f on an incident side and a second surface 12g on an emission side, and both the surfaces 12f and 12g extend in a direction substantially orthogonal to the optical axis AX as a whole, and in directions substantially orthogonal to each other. Neither the surface 12f nor the surface 12g is limited to a flat surface, and can be a spherical or aspherical surface having an optical power, or the like, or may be a free curved surface or another non-axisymmetric surface. Neither the prism mirror 12b nor the surface reflection-type bending mirror 12c is an essential component and may be omitted, but they allow the projection optical member 12 to be easily disposed in the frame 80 in a space-saving manner by bending the optical axis AX of the projection optical member 12.

The projection optical member 12 forms an intermediate image II, which is formed by appropriately enlarging an image formed on the display surface 11a of the display device 11, in a prism member 13 of a subsequent stage. By forming the intermediate image II in the prism member 13, it becomes easy to reduce the size of the optical system including the prism member 13 and the like. In addition, by forming the intermediate image II so as not to overlap with an incident surface 13f described below, contaminants on the surface of the incident surface 13f are prevented from affecting image formation, and image unevenness can thus be prevented from being formed. Further, by forming the intermediate image II at a position apart from a first joining surface 13h described below not to overlap with the first joining surface 13h or a semi-transmissive reflection surface 31 described below, it is also possible to prevent contaminants or air bubbles from affecting the image formation and prevent the image unevenness from being formed. An image surface of the intermediate image II is curved, as described below in more detail.

The prism member 13 is disposed directly below the projection optical member 12 and has a square plate-like appearance extending in the X and Y directions and perpendicular to the Z direction. The prism member 13 includes a first prism 13a on which the image light GL from the projection optical member 12 is incident, and a second prism 13b disposed closer to an exit pupil EP side or a pupil EY side than the first prism 13a as a whole. Both the first and second prisms 13a and 13b are triangular prisms extending in the X-axis direction.

The first prism 13a includes an incident surface 13f on which the image light GL is incident, a reflection surface 13g that totally reflects the image light GL from the incident surface 13f, and the first joining surface 13h that is joined with the second prism 13b via the semi-transmissive reflection surface 31. Here, the incident face 13f is orthogonal to the optical axis AX and extends substantially parallel to the second surface 12g while opposing the inclined second surface 12g of the prism mirror 12b. The incident surface 13f is a flat surface in the illustrated example, but can also have an optical power. The incident surface 13f is inclined in an intermediate direction between a +Y direction and a −Z direction. Meanwhile, the reflection surface 13g is a flat surface extending along a vertical XY surface without being inclined. The reflection surface 13g functions as a mirror having a high reflectance, namely, a total reflection surface, with respect to the image light GL that is initially incident along the optical path and has a relatively large incident angle, by using the total reflection on the inner surface, but the reflection surface 13g functions as a passing surface or a refractive surface with respect to the image light GL that is subsequently incident along the optical path and has a relatively small incident angle. The first joining surface 13h is a flat surface inclined with respect to the optical axis AX, and is a flat surface also inclined with respect to the Y direction and the Z direction. The semi-transmissive reflection surface 31 formed along the first joining surface 13h reflects the image light GL totally reflected by the reflection surface 13g toward the reflection surface 13g. In other words, the semi-transmissive reflection surface 31 reflects the image light GL from the reflection surface 13g in a +Z direction, which is an external side as a whole.

The second prism 13b includes a second joining surface 13i that is joined with the first joining surface 13h of the first prism 13a via the semi-transmissive reflection surface 31, and an opposing flat surface 13j disposed to oppose and be in parallel with the reflection surface 13g of the first prism 13a. The second joining surface 13i is a flat surface aligned with the first joining surface 13h. The opposing flat surface 13j transmits the image light GL, which was reflected by the semi-transmissive reflection surface 31 and passed through the light condensing and reflecting member 14 described below in detail, and then transmitted through the semi-transparent reflection surface 31, and causes the image light GL to be emitted to the position of the exit pupil EP. Since the reflection surface 13g and the opposing flat surface 13j are in parallel with each other, the prism member 13 includes a side surface that functions as a parallel plate when the semi-transparent reflection surface 31 is ignored. The semi-transparent reflection surface 31 is set to have a transmittance of approximately 10% to 50%, for example. In particular, when the transmittance of the semi-transmissive reflection surface 31 is set to be approximately 50%, the reflectance of the semi-transmissive reflection surface 31 and the transmittance of the semi-transmissive reflection surface 31 can be made substantially equal. In this case, light utilization efficiency can be maximized.

The semi-transmissive reflection surface 31 has a role of causing the image light GL guided into the first prism 13a of the prism member 13 to be emitted in the +Z direction, which is a normal direction of the prism member 13 or the reflection surface 13g, and to be incident on the light condensing and reflecting member 14. The semi-transmissive reflection surface 31 forms an angle θ that is 45° or greater and more preferably greater than 45° with respect to the Y axis corresponding to the up-and-down direction or the vertical direction. In other words, a normal line of the semi-transmissive reflection surface 31 forms an angle that is 45° or greater and more preferably greater than 45° with respect to the Y axis, and more specifically forms an angle of approximately 60°. On the other hand, the semi-transmissive reflection surface 31 forms an angle φ of 45° or less and more preferably less than 45° with respect to the reflection surface 13g of the first prism 13a. In accordance with this, the semi-transmissive reflection surface 31 does not cause the image light GL, which has been incident on the prism member 13 from the projection optical member 12, to be directly incident on the semi-transmissive reflection surface 31, but causes the image light GL to be incident on the semi-transmissive reflection surface 31 via the reflection surface 13g that functions as a total reflection surface. In this way, by inclining the semi-transmissive reflection surface 31 at an angle greater than 45° with respect to the vertical direction with the reflection surface 13g intervened, namely, by inclining the semi-transmissive reflection surface 31 at an angle less than 45° with respect to the reflection surface 13g, even though the image light GL is guided into the prism member 13 from a direction intersecting the optical axis AX extending on the exit pupil EP side or in the Z direction in front of the pupil EY, the thickness of the prism member 13 in the Z direction can be reduced.

In the second prism 13b, a coupling surface 13p is disposed between one end of the second joining surface 13i and one end of the opposing flat surface 13j. A light absorbing member 85 is provided at an outer side of the second prism 13b to oppose the coupling surface 13p. The light-absorbing member 85 can inhibit the image light GL that has been partially transmitted without being reflected by the semi-transmissive reflection surface 31 from being incident on the coupling surface 13p and becoming stray light.

The light condensing and reflecting member 14 is disposed at the external side of the prism member 13, which is an opposite side to the exit pupil EP with the prism member 13 interposed between the external side of the prism member 13 and the exit pupil EP. The light condensing and reflecting member 14 is a curved plate-like member and has a rectangular profile when viewed from the front. The light condensing and reflecting member 14 includes a light condensing and reflecting surface 14c, which is an internal reflection-type mirror, and which returns a portion of the image light GL already emitted from the reflection surface 13g of the prism member 13 to the prism member 13 via the reflection surface 13g. The light condensing and reflecting member 14 is formed by the light condensing and reflecting surface 14c being formed on an outer side of a substrate 14f, which is a light-transmissive thin plate-like member, and the light condensing and reflecting member 14 reflects the image light GL by internal reflection. The light condensing and reflecting surface 14c of the light condensing and reflecting member 14 is a non-eccentric type reflection surface, and is spherical as a whole. Specifically, the light condensing and reflecting surface 14c can be a spherical or aspherical surface having an optical power, or the like, and an axis of symmetry of the light condensing and reflecting surface 14c extends along the light axis AX direction or the Z direction. The light condensing and reflecting 14c is not limited to the spherical surface or the like, and may be a free curved surface or another non-axisymmetric surface. In the light condensing and reflecting member 14, the curvature of a transmission surface 14t that opposes the light condensing and reflecting surface 14c of the substrate 14f is substantially equal to the curvature of the light condensing and reflecting surface 14c. By bringing the curvature of the transmission surface 14t closer to the curvature of the light condensing and reflecting surface 14c as described above, distortion in see-through vision can be reduced. The substrate 14f, which is the thin plate-like member, can also have an aberration correction function. The light condensing and reflecting surface 14c is not limited to the surface using the internal reflection, and can be formed on the exit pupil EP or pupil EY side of the substrate 14f.

As described above, the light condensing and reflecting surface 14c of the light condensing and reflecting member 14 has a spherical surface or a shape similar to the spherical surface. The radius of curvature of the light condensing and reflecting surface 14c (including a case when an approximate radius of curvature is the radius of curvature) $R_m$ is a value close to 2×Da that is twice an air conversion distance $D_a$, which is an optical path length from the light condensing and reflecting surface 14c to the intermediate image II. In this way, the image light GL from the intermediate image II can be collimated, and the image light GL corresponding to a distant virtual image can be caused to be incident on the exit pupil EP side or the pupil EY. At this time, it is preferable that the exit pupil EP, disposed at a position corresponding to a diaphragm with respect to the light condensing and reflecting surface 14c, is disposed at a position apart from the light condensing and reflecting surface 14c by approximately an optical distance of the radius of curvature $R_n$ while taking into account an actual principal ray. In other words, it is preferable that an air conversion length L from the exit pupil EP to a light condensing and reflecting surface 13k is L≅Rm from the perspective of suppressing aberrations and improving performance. In this way, comatic aberration, astigmatism, and the like can be substantially reduced to zero since the image light GL emitted substantially perpendicularly from the light condensing and reflecting surface 14c is incident on the exit pupil EP. Here, specifically, the air conversion length L is in error by 15% or less with respect to the above-described air conversion value Rm. When the light condensing and reflecting surface 14c is the spherical surface, the radius of curvature $R_m$ of the light condensing and reflecting surface 14c is the radius of curvature of the spherical surface, but when the light condensing and reflecting surface 14c is the aspherical surface or the free curved surface, the radius of curvature $R_m$ of the light condensing and reflecting surface 14c is an approximate radius of curvature obtained when the spherical surface is fitted to this surface. Further, the aberration can be further reduced by causing the intermediate image II to protrude toward the light condensing and reflecting member 14 side, forming the intermediate image II in a shape close to a spherical surface as a whole, and causing the intermediate image II to have the approximate radius of curvature of approximately ½×$R_m$/n, which is a half of a radius of curvature $R_m$/n of the light condensing and reflecting surface 14c. Here, (½)×$R_m$/n is modified based on the refractive index of the first prism 13a. Note that the optical distance or the optical path length from the light condensing and reflecting surface 14c to the exit pupil EP, namely, the position of the light condensing and reflecting surface 14c with respect to the exit pupil EP in terms of the air conversion length changes depending on an angle of view of the head-mounted display 100. Here, the optical distance from the light condensing and reflecting surface 14c to the exit pupil EP is a distance obtained by adding an eye relief, which is a distance from the exit pupil EP to the prism member 13, the thickness of the prism member 13, and a reflection surface distance from the prism member 13 to the light condensing and reflecting surface 14c while taking into account the refractive index. The angle of view of the head-mounted display 100 is set to be 45°, for example. The thickness of the prism member 13, for example, is adjusted such that the optical distance from the light condensing and reflecting surface 14c to the exit pupil EP can be established in accordance with such an angle of view.

In the above description relating to the position of the intermediate image II and the like, it is assumed that there is a case in which the light condensing and reflecting surface 14c is formed on the outer side of the substrate 14f and a case in which the light condensing and reflecting surface 14c is formed on the exit pupil EP side of the substrate 14f. In the case of the internal reflection-type in which the light condensing and reflecting surface 14c is formed on the outer side of the substrate 14f, it is assumed that the curvature of the light condensing and reflecting surface 14c of the light condensing and reflecting member 14 is substantially equal to the curvature of the transmission surface 14t. When these curvatures are different, it is preferable that a value obtained by converting the curvature radius $R_m$ of the light condensing and reflecting surface 14c while taking into account the difference in curvatures is used as a reference.

The light condensing and reflecting surface 14c of the light condensing and reflecting member 14 is semi-transmissive. This enables a see-through vision of an external scene since an external light OL passes through the light condensing and reflecting member 14 and the prism member 13. At this time, when the light condensing and reflecting member 14 is as thin as approximately several millimeters or less, changes in the magnification of an external image can be reduced. The reflectance of the light condensing and reflecting surface 14c with respect to the image light GL and the external light OL is set to be 10% or greater and 50% or less in an assumed incident angle range of the image light GL from the perspective of securing the luminance of the image light GL and making it easy to observe external light in a see-through manner.

According to the head-mounted display 100 described above, the first prism 13a includes the reflection surface 13g that totally reflects the image light GL from the incident surface 13f. The semi-transmissive reflection surface 31 reflects the image light GL totally reflected by the reflection surface 13g toward the reflection surface 13g and causes the image light GL to be once emitted from the prism member 13, and at least a portion of the image light GL emitted from the prism member 13 is returned to the prism member 13 by the light condensing and reflecting surface 14c. Thus, an inclination angle of the semi-transmissive reflection surface 31 can be increased, and the thickness of the prism member 13 can be reduced. As a result, the optical system can be made smaller while making the angle of view of the display by the head-mounted display 100 equivalent to or wider than that of the related art.

Figure 2:
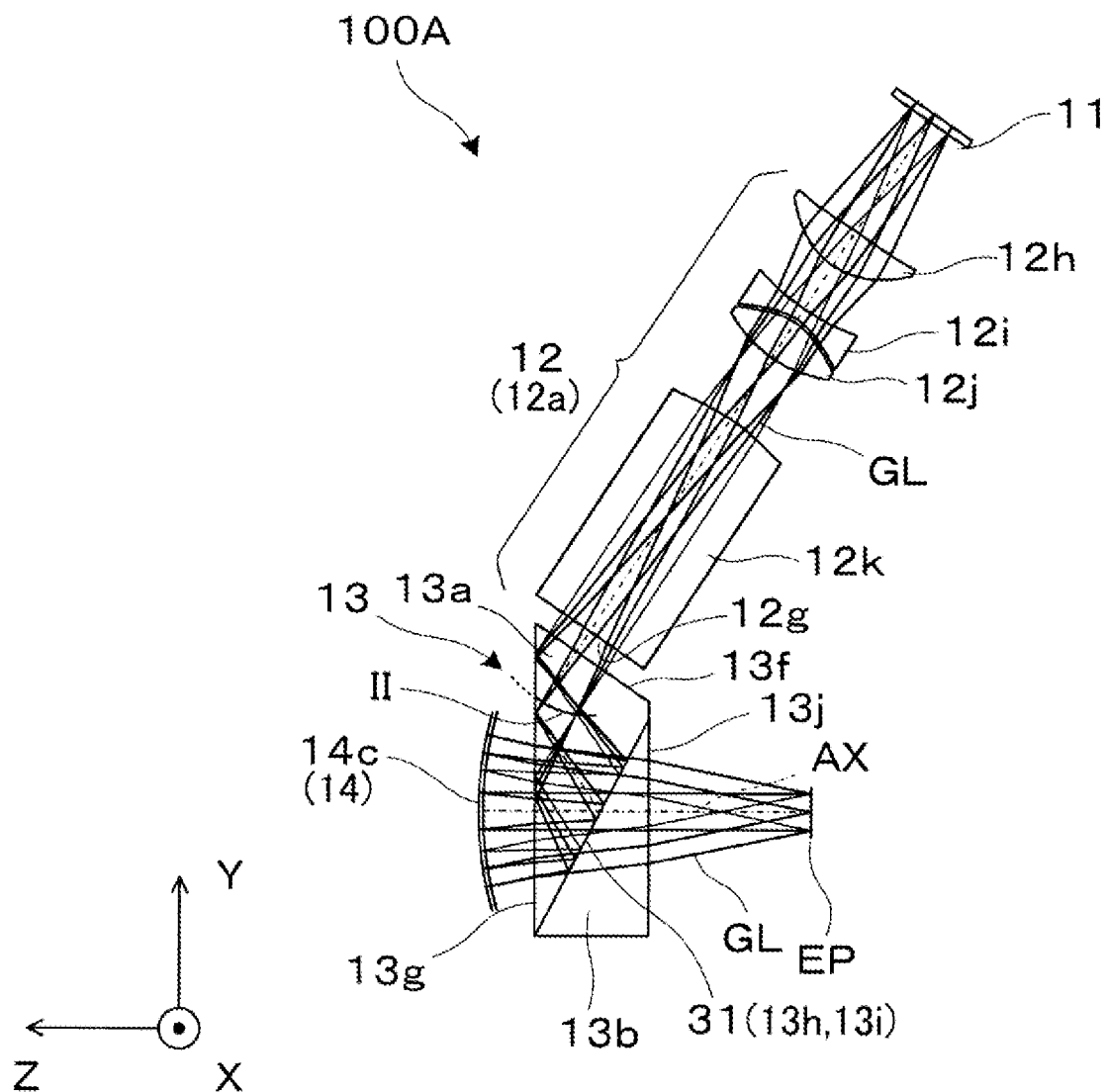
FIG. 2 is a side cross-sectional view illustrating a head-mounted display of Example 1.

FIG. 2 is a cross-sectional view illustrating an optical configuration of a head-mounted display 100A of specific Example 1. The head-mounted display 100A has the same basic structure as the head-mounted display 100 illustrated in FIG. 1, and includes the display device 11, the projection optical member 12, the prism member 13, and the light condensing and reflecting member 14. However, in the case of the head-mounted display 100A illustrated in FIG. 2, the projection optical member 12 includes only the projection lens 12a, and the prism mirror for optical path bending is omitted. The projection lens 12a includes first to fourth lenses 12h, 12i, 12j, and 12k. These first to fourth lenses 12h, 12i, 12j, and 12k are each configured by a spherical surface or an aspherical surface. In the illustrated case, the light condensing and reflecting surface 14c is disposed on an inner side or the exit pupil EP side with respect to the substrate 14f, but the light condensing and reflecting surface 14c may be disposed on the external side with respect to the substrate 14f.

Figure 3A:
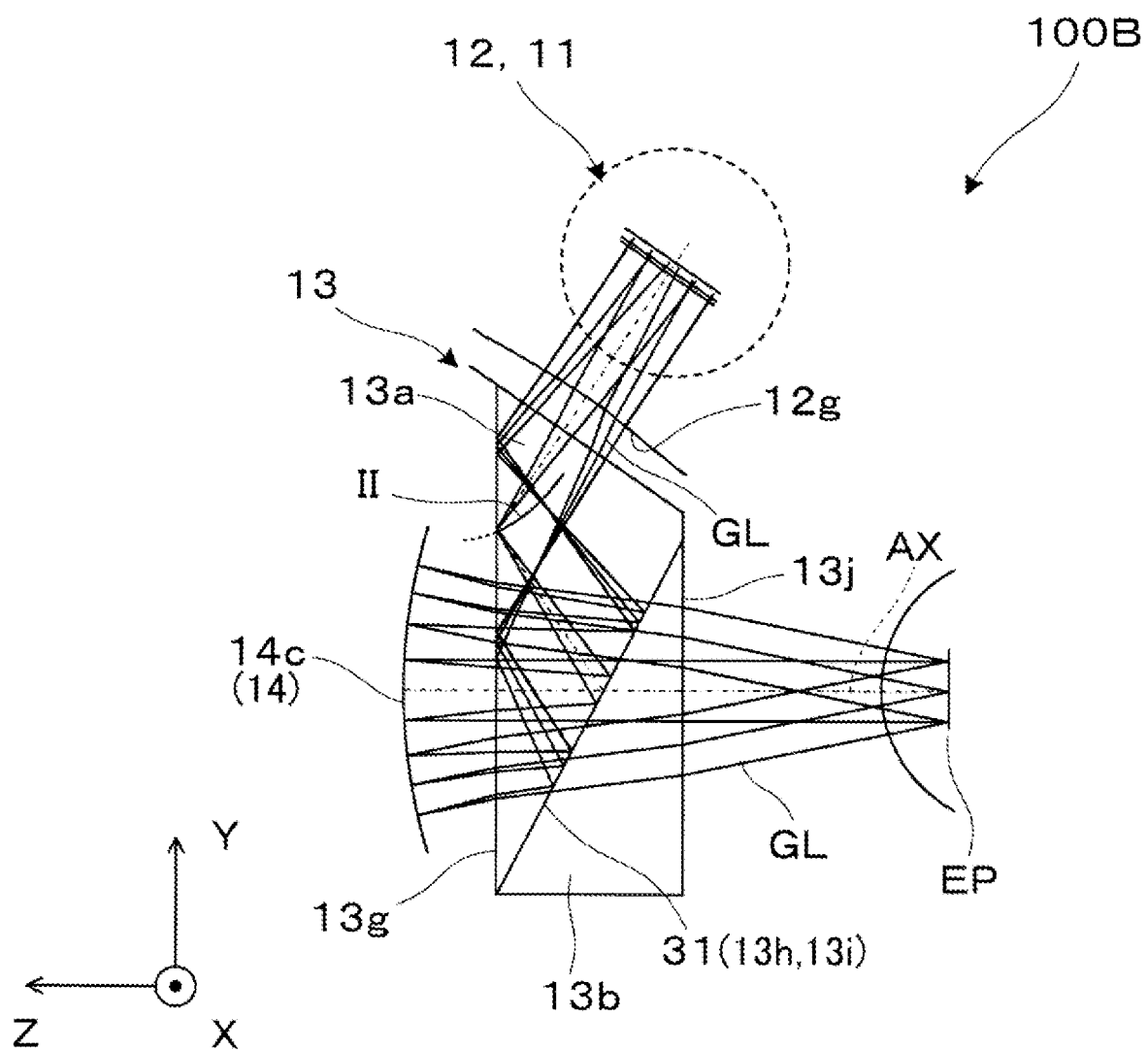
FIG. 3A is a side cross-sectional view illustrating a head-mounted display of Example 2.
Figure 3B:
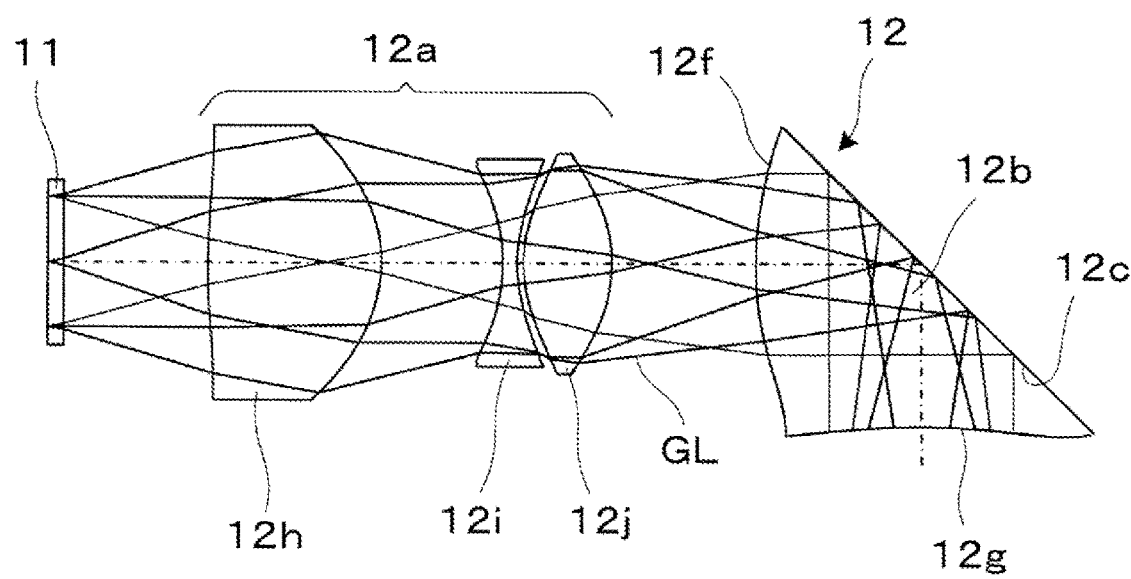
FIG. 3B is a cross-sectional view, from an oblique direction, illustrating the head-mounted display of Example 2.

FIGS. 3A and 3B are cross-sectional views illustrating an optical configuration of a head-mounted display 100B of Example 2. The head-mounted display 100B has the same basic structure as the head-mounted display 100 illustrated in FIG. 1, and includes the display device 11, the projection optical member 12, the prism member 13, and the light condensing and reflecting member 14. In the case of the head-mounted display 100B illustrated in FIG. 3A and the like, the projection lens 12a includes the first to third lenses 12h, 12i, and 12j. These first to third lenses 12h, 12i, and 12j are each configured by a spherical surface or an aspherical surface. In the illustrated case, the light condensing and reflecting surface 14c is disposed on an inner side or the exit pupil EP side with respect to the substrate 14f, but the light condensing and reflecting surface 14c may be disposed on the external side with respect to the substrate 14f.

Figure 4A:
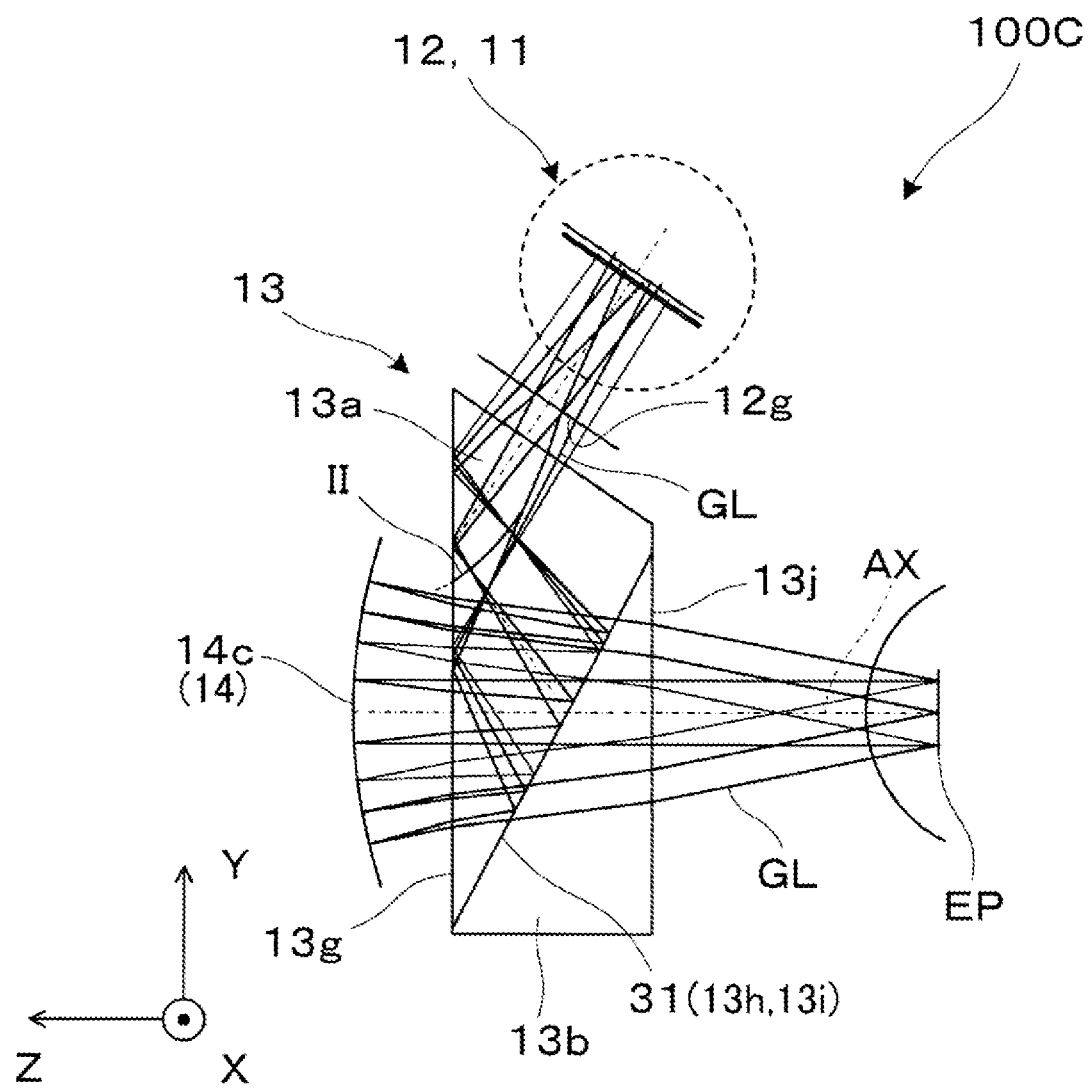
FIG. 4A is a side cross-sectional view illustrating a head-mounted display of Example 3.
Figure 4B:
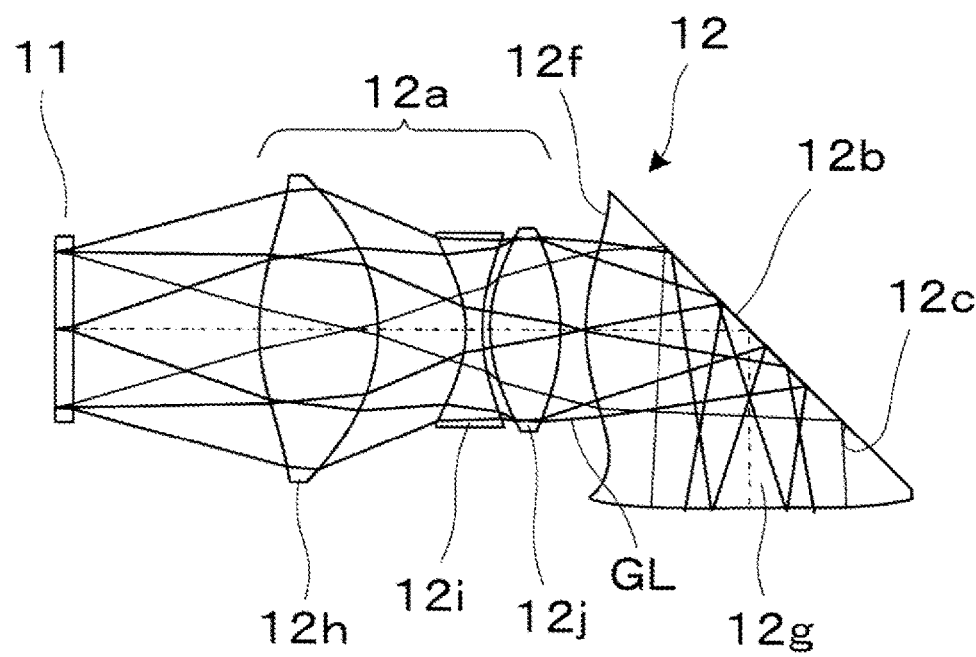
FIG. 4B is a cross-sectional view, from an oblique direction, illustrating the head-mounted display of Example 3.
Figure 4B:
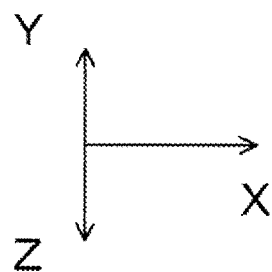

FIGS. 4A and 4B are cross-sectional views illustrating an optical configuration of a head-mounted display 100C of Example 3. The head-mounted display 100C has the same basic structure as the head-mounted display 100 illustrated in FIG. 1, and includes the display device 11, the projection optical member 12, the prism member 13, and the light condensing and reflecting member 14. In the case of the head-mounted display 100C illustrated in FIG. 4A and the like, the projection lens 12a includes the first to third lenses 12h, 12i, and 12j. These first to third lenses 12h, 12i, and 12j are each configured by a spherical surface or an aspherical surface. In the illustrated case, the light condensing and reflecting surface 14c is disposed on an inner side or the exit pupil EP side with respect to the substrate 14f, but the light condensing and reflecting surface 14c may be disposed on the external side with respect to the substrate 14f.

Second Embodiment

Below, the head-mounted display according to a second embodiment of the present disclosure will be described. Note that the head-mounted display of the second embodiment is obtained by partly modifying the head-mounted display of the first embodiment, and a description of common structural elements will be omitted.

Figure 5:
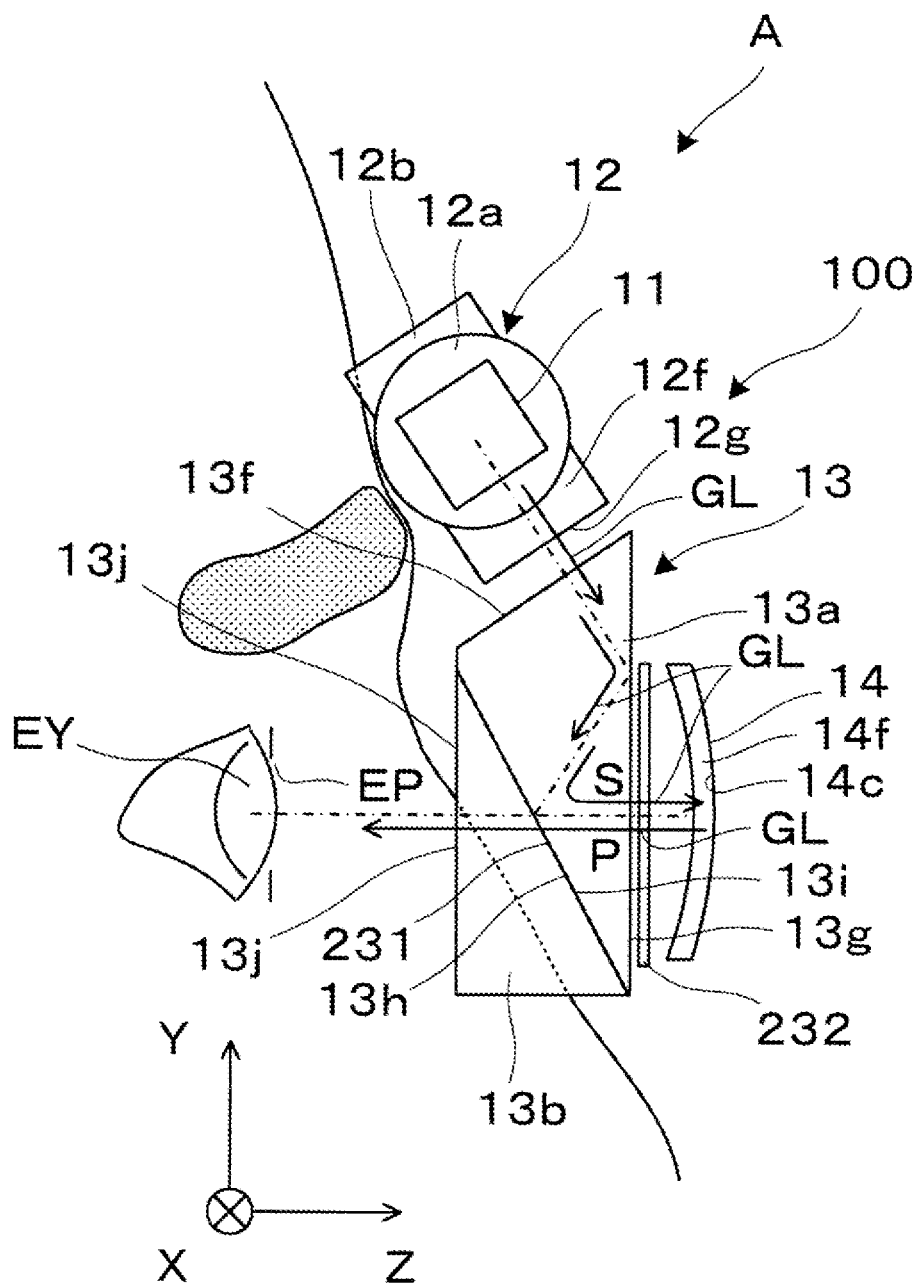
FIG. 5 is a diagram illustrating the head-mounted display according to a second embodiment.

As illustrated in FIG. 5, the head-mounted display 100 of the second embodiment includes the display device 11, the projection optical member 12, the prism member 13, and the light condensing and reflecting member 14. In the prism member 13, a semi-transmissive reflection surface 231 is a polarization separation film that reflects S-polarized light and transmits P-polarized light, for example. A wavelength plate 232 is disposed between the prism member 13 and the light condensing and reflecting member 14. Specifically, the wavelength plate 232 is a ¼ wavelength plate, and is disposed parallel to the reflection surface 13g of the first prism 13a with being separated from the reflection surface 13g by an appropriate distance. In this case, the image light GL emitted from the display device 11 is only the S-polarized light, for example. While the display device 11 itself may generate the polarized light, it is also possible to select and use polarized light of a predetermined direction from image light formed by the display device 11. After the image light GL from the display device 11 is incident on the prism member 13 and forms the intermediate image II, the image light GL is reflected by the semi-transmissive reflection surface 231 almost without any loss. The image light GL of the S-polarized light reflected by the semi-transmissive reflection surface 231 passes through the reflection surface 13g and the wavelength plate 232, is incident on the light condensing and reflecting member 14, is reflected by the light condensing and reflecting member 14, and is once again incident on the semi-transmissive reflection surface 231. The image light GL that is once again incident on the semi-transmissive reflection surface 231 is the P-polarized light, as a result of the polarization direction of the image light GL being rotated by 90° by the wavelength plate 232. As a result, the image light GL is transmitted through the semi-transmissive reflection surface 231 almost without any loss, and the image light GL that is bright is incident on the exit pupil EP.

Modification Examples and Others

The present disclosure is described according to the above-mentioned embodiments, but the present disclosure is not limited to the above-mentioned embodiments. The present disclosure may be carried out in various modes without departing from the gist of the present disclosure, and, for example, the following modifications may be carried out.

In the head-mounted display 100 of the above-described embodiments, the light-emitting type display element, such as the organic EL element, is used as the display device 11, but in place of this, a configuration can also be adopted in which a laser scanner that is configured by a combination of a laser light source and a scanner, such as a polygon mirror, is used as the display device 11.

The first prism 13a of the prism member 13 may be joined to the prism mirror 12b of the projection optical member 12.

The light condensing and reflecting member 14 may be a mirror that does not have light-transmissive properties. In this case, a head-mounted display of a type that does not observe the external light OL or the external image is obtained.

The reflection surface 13g of the first prism 13a or the opposing flat surface 13j of the second prism 13b may be formed with a hard coat layer or an anti-reflection coating.

In the second embodiment, the wavelength plate 232 need not necessarily be disposed at the illustrated position, but may be incorporated on the light condensing and reflecting member 14 side to be adjacent to the semi-transmissive reflection surface 231, for example. In this case, since the image light GL passes through the wavelength plate and is incident on the semi-transmissive reflection surface 231, to accommodate this, a polarization state of the image light GL emitted from the display device 11 or the projection optical member 12 is appropriately adjusted.

The optical system for one eye, which is configured by one set of the display device 11, the projection optical member 12, and the prism member 13, can also be disposed to be rotated outwardly by 90° from the illustrated state around an optical axis parallel to the Z-axis, for example.

In the above description, it is assumed that the head-mounted display 100 is used while being worn on the head, but the above-described head-mounted display 100 can also be used as a hand-held display that is not worn on the head, but is looked into like a pair of binoculars.

What is claimed is:

1. A head-mounted display comprising:
   a display element;
   a projection optical member configured to receive image light emitted from the display element and project the image light;
   a prism member configured to receive the image light emitted from the projection optical member and emit the image light to a position of an exit pupil; and
   a light condensing and reflecting surface disposed at an external side of the prism member, with the external side being an opposite side from the exit pupil across the prism member, and configured to return at least a portion of the image light, which has been emitted from the prism member, to the prism member, wherein
   the prism member includes a first prism on which the image light from the projection optical member is incident, and a second prism disposed further toward the exit pupil side than the first prism,
   the first prism includes an incident surface on which the image light is incident, a reflection surface that totally reflects the image light from the incident surface, and a first joining surface that is joined with the second prism via a semi-transmissive reflection surface configured to reflect the image light, totally reflected by the reflection surface, toward the reflection surface,
   the second prism includes a second joining surface that is joined with the first joining surface via the semi-transmissive reflection surface, and an opposing flat surface that is disposed parallel to the reflection surface to face the reflection surface and configured to transmit the image light, reflected by the semi-transmissive reflection surface and then by the light condensing and reflecting surface and thereafter passing through the semi-transmissive reflection surface,
   the projection optical member is configured to form an intermediate image in the prism member, and
   a radius of curvature of the light condensing and reflecting surface is approximately twice an optical distance from the light condensing and reflecting surface to the intermediate image.

2. The head-mounted display according to claim 1, wherein the intermediate image is formed at a position away from the first joining surface.

3. The head-mounted display according to claim 1, wherein the optical distance from the light condensing and reflecting surface to the exit pupil is approximately equal to the radius of curvature of the light condensing and reflecting surface.

4. The head-mounted display according to claim 1, wherein the projection optical member includes a bending mirror at the prism member side.

5. The head-mounted display according to claim 4, wherein the bending mirror is a part of a prism mirror including a non-axisymmetric surface.

6. The head-mounted display according to claim 1, wherein the light condensing and reflecting surface has light-transmissive properties.

7. The head-mounted display according to claim 1, wherein reflectance of the semi-transmissive reflection surface is approximately equal to transmittance of the semi-transmissive reflection surface.

8. The head-mounted display according to claim 1, wherein an angle formed by the reflection surface of the first prism and the semi-transmissive reflection surface between the first and second prisms is less than 45°.

9. The head-mounted display according to claim 1, wherein the second prism includes a coupling surface disposed between one end of the second joining surface and one end of the opposing flat surface, the head-mounted display further comprising a light absorbing member disposed at an outside of the coupling surface.

10. The head-mounted display according to claim 1, wherein the light condensing and reflecting surface is an internal reflection-type mirror including a substrate on which a mirror surface is formed, and a curvature of a surface of the substrate opposite the light condensing and reflecting surface is substantially equal to a curvature of the mirror surface.

11. The head-mounted display according to claim 1, wherein the semi-transmissive reflection surface is formed by a polarization separation film, and a wavelength plate is disposed between the prism member and the light condensing and reflecting surface.

\* \* \* \* \*